(12) United States Patent
Schweizer

(10) Patent No.: US 10,160,604 B2
(45) Date of Patent: Dec. 25, 2018

(54) METERING DEVICE WITH STORAGE CONTAINER AND DISCHARGE DEVICE

(71) Applicant: Schenck Process GmbH, Darmstadt (DE)

(72) Inventor: Peter Schweizer, Langen (DE)

(73) Assignee: Schenck Process Europe GmbH, Darmstadt (DE)

( * ) Notice: Subject to any disclaimer, the term of this patent is extended or adjusted under 35 U.S.C. 154(b) by 230 days.

(21) Appl. No.: 15/054,659

(22) Filed: Feb. 26, 2016

(65) Prior Publication Data

US 2016/0176662 A1 Jun. 23, 2016

Related U.S. Application Data

(63) Continuation of application No. PCT/EP2014/002339, filed on Aug. 27, 2014.

(30) Foreign Application Priority Data

Aug. 30, 2013 (DE) .................. 10 2013 014 375

(51) Int. Cl.
  *B65G 33/08* (2006.01)
  *B65G 65/44* (2006.01)
  *B65G 65/46* (2006.01)

(52) U.S. Cl.
  CPC .............. *B65G 33/08* (2013.01); *B65G 65/44* (2013.01); *B65G 65/46* (2013.01)

(58) Field of Classification Search
  CPC ........ B65G 65/42; B65G 65/44; B65G 11/00; B65G 33/08; B65G 65/46; B65G 65/466; B65G 65/425; B65G 65/4809; B65G 65/4818; B65G 65/489; B65G 65/4863; G01F 13/001; G01F 13/005; F27D 2003/0087; F27D 2015/0293
  USPC ........................................ 222/144, 167, 168
  See application file for complete search history.

(56) References Cited

U.S. PATENT DOCUMENTS

| 2,638,248 | A | * | 5/1953 | Alvord ................... | B65G 65/44 198/524 |
| 2,665,797 | A | * | 1/1954 | Leypoldt ................ | B65G 65/44 198/769 |
| 3,100,052 | A | | 8/1963 | Brembeck | |
| 3,261,592 | A | * | 7/1966 | Dumbaugh ............ | B65G 65/44 222/161 |
| 3,799,404 | A | | 3/1974 | Taupin | |

(Continued)

FOREIGN PATENT DOCUMENTS

| AU | 531 044 B2 | 8/1983 |
| CN | 103253519 A | 8/2013 |

(Continued)

*Primary Examiner* — Glenn F Myers
(74) *Attorney, Agent, or Firm* — Muncy, Geissler, Olds & Lowe, P.C.

(57) ABSTRACT

A metering device having a storage container and a discharge device. The storage container has an inlet opening, a perpendicular central axis, and an outlet opening. The discharge device is arranged so as to be rotatable about an outlet axis of the outlet opening of the storage container, said outlet axis running at a distance to the central axis of the storage container, and the outlet opening of the storage container corresponds to the loading point of the discharge device.

14 Claims, 3 Drawing Sheets

(56) References Cited

U.S. PATENT DOCUMENTS

| | | | | |
|---|---|---|---|---|
| 3,910,173 | A | * | 10/1975 | Zepponi .................. A23N 1/00 |
| | | | | 222/460 |
| 4,273,266 | A | * | 6/1981 | Snape .................... B65G 65/44 |
| | | | | 198/540 |
| 4,983,090 | A | | 1/1991 | Lehmann et al. |
| 5,381,967 | A | | 1/1995 | King |
| 9,096,394 | B2 | | 8/2015 | Mikulec et al. |
| 2009/0059716 | A1 | * | 3/2009 | Katsumata ............ G01F 13/005 |
| | | | | 366/141 |
| 2011/0035048 | A1 | | 2/2011 | Mikulec et al. |
| 2011/0083910 | A1 | | 4/2011 | Mikulec et al. |
| 2016/0176662 | A1 | | 6/2016 | Schweizer |

FOREIGN PATENT DOCUMENTS

| | | |
|---|---|---|
| CN | 103264901 A | 8/2013 |
| CN | 1054311365 A | 3/2016 |
| DE | 1 129 891 B | 5/1962 |
| DE | 22 31 497 B2 | 1/1975 |
| DE | 89 03 711 U1 | 5/1989 |
| DE | 44 39 401 A1 | 5/1996 |
| DE | 10 2007 055 566 A1 | 5/2009 |
| DE | 10 2011 110 960 A1 | 2/2013 |
| FR | 2 635 314 A1 | 2/1990 |
| JP | S 64-36325 U | 3/1989 |
| WO | WO 2006/010475 A1 | 2/2006 |

\* cited by examiner

METERING DEVICE WITH STORAGE CONTAINER AND DISCHARGE DEVICE

This nonprovisional application is a continuation of International Application No. PCT/EP2014/002339, which was filed on Aug. 27, 2014, and which claims priority to German Patent Application No. 10 2013 014 375.6, which was filed in Germany on Aug. 30, 2013, and which are both herein incorporated by reference.

BACKGROUND OF THE INVENTION

Field of the Invention

The present invention relates to a metering device with a storage container and a discharge device.

Description of the Background Art

Discharge devices with conveying devices are used in metering devices to draw a conveyed material from a storage container and deliver it to a subsequent process. Such metering devices for bulk material, having storage containers and discharge devices, are known, for example, from DE 10 2007 055 566 A1, which corresponds to US 20110035048 and US20110083910, which are incorporated herein by reference, and from DE 10 2011 110 960 A1, which corresponds to U.S. Pat. No. 9,096,394, which is incorporated herein by reference.

Storage containers typically are permanently secured to the ground, a substructure, a frame, or a framework, while the associated discharge devices are supported on or attached to the storage container or a substructure. To adapt to local circumstances, conveying devices of different lengths are typically used to bridge different horizontal distances. This means that when new local circumstances are created or existing ones are changed, the conveying device, or at least a component of the conveying device, must be swapped out, replaced, or adapted. Depending on the nature of the conveying device, this often requires adaptation and retuning of the entire discharge device, which entails considerable effort.

SUMMARY OF THE INVENTION

It is therefore an object of the invention to provide a metering device that is improved with regard to its adaptation to different geometric circumstances.

In an embodiment, the invention provides a metering device having a storage container that has an inlet opening, a vertical center axis, and an outlet opening, and having a discharge device that comprises a conveying device and a drive for the conveying device. The conveying device here has a loading point and a delivery point, which are arranged at a distance C from one another. In this design, the outlet opening of the storage container corresponds to the loading point of the conveying device. It is immaterial here what cross-section the storage container has and whether this cross-section is symmetric with respect to the center axis. The term center axis here is understood to mean the axis passing vertically through a point within the cross-sectional contour of the storage container inlet plane. The discharge device can be provided such that it can rotate about an outlet axis of the outlet opening of the storage container, wherein the outlet axis is located at a distance B from the center axis of the storage container.

Since metering devices frequently are used in facilities with limited spatial conditions, appropriate adaptations of the metering devices are required when changes are made to the processes. Because the discharge device of the metering device according to the invention can be rotated relative to the storage container, it is possible to achieve adaptation to local circumstances without structural changes to the individual components. The distance C from the loading point to the delivery point of the conveying device and the distance B from the outlet axis of the outlet opening to the center axis of the storage container remain constant in each case. The delivery point of the conveying device can be spatially oriented in any desired manner by rotating the discharge device, so that great geometric flexibility can be achieved with the components remaining the same.

By rotating the metering device as a whole and the discharge device arranged so as to be rotatable relative to the storage container, the delivery point of the conveying device can be variably arranged in an annular plane A that is perpendicular to the center axis of the storage container. The annular plane here has an area $A=\pi*((C+B)^2-(C-B)^2)$ as a function of the aforementioned components. Arrangements in which the storage container is rotatably supported within the metering device are advantageous. The advantage derives from the fact that there is no need to reroute any supply or signal lines from and to the metering device.

Which components of the metering device are rotated relative to the other components in order to achieve a desired position can depend on factors including the type of conveying device and the associated drive device and their arrangement relative to one another.

Whereas metering devices from the prior art have a discharge length determined by their components, which generally results from the distance of the delivery point of the conveying device to the center axis of the storage container, the discharge length of the metering device according to the invention is variably adjustable as well. In this design, any discharge length x is achievable that is between a maximum value $x1=C+B$ and a minimum value $x2=C-B$.

Multiple variants are conceivable for the design implementation of the metering device as a function of the spatial circumstances and process conditions. Firstly, the discharge device can be supported directly on the storage container, for example in that it is attached so as to suspend therefrom. Alternatively, the discharge device can be arranged to stand beneath the storage container, or can be attached to a bracket. In this context, a bracket is to be understood to mean a type of stage or auxiliary construction that is provided in order to position the discharge device relative to the storage container, and is separate from the actual substrate, foundation, or framework for the metering device. Such a bracket advantageously has an area that essentially corresponds to the vertical projection of the area of the storage container.

The embodiment of the metering device is not limited to a specific discharge device in this context. Depending on the nature of the material to be metered or of the bulk material, different conveying devices and drives are possible, and accordingly different inclinations of the conveying devices relative to the horizontal as well. According to an embodiment of the metering device, the conveying device of the discharge device can be provided as a screw conveyor, for example. It is immaterial here whether this is a screw conveyor with a single metering screw or double metering screw/twin-shaft metering screw, and whether these are located in a screw trough with or without a trough cover.

According to an embodiment of the invention, the conveying device of the discharge device can be provided as a conveyor chute and the drive of the discharge device as a vibratory drive that sets the conveyor chute into vibration.

These discharge devices are especially suited for free-flowing or pourable bulk materials such as granules or grits. Discharge devices of this design constitute a two-mass oscillating system with a specific self-resonance. The selection and arrangement of the drive of the conveyor chute accelerates the bulk material during vibratory motion with an upward vertical component and with a horizontal component in the conveying direction, by which means the desired conveying action is obtained (micro-throw principle). To drive the system, it is necessary for the resonant frequency of the system to lie within certain limits. With prior art metering systems, in which the length of the metering chute had to be changed to adapt to geometric circumstances, the change in length also changed the mass and the location of the center of gravity relative to the drive. Consequently, for discharge devices with conveyor chutes and vibratory drives, the entire system had to be retuned again in the event of a change in the length of the conveyor chute in order to bring the resonant frequency back into a certain range. In contrast, a metering device according to the invention with a conveyor chute and vibratory drive always has the same function-determining physical relationships with regard to the vibratory drive despite having a variable discharge length. The type of vibratory drive is likewise variable in this context. Vibratory drives in the form of magnetic, pneumatic, eccentric, or unbalance drives may be used. The mechanical construction of the conveyor chute should be adapted accordingly, based on the choice of vibratory drive.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
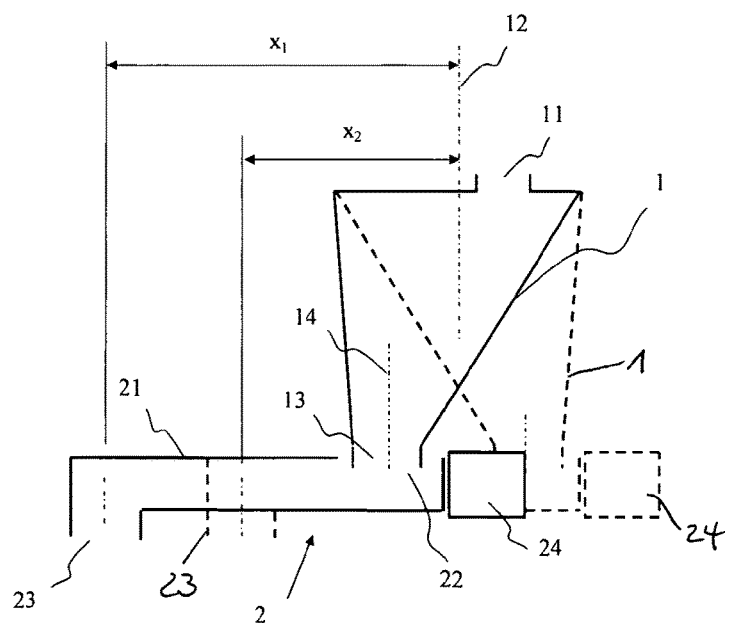
FIG. 1 is a side view of a metering device according to the invention, in a schematic representation.

FIG. 1 shows a side view of a metering device according to the invention in a schematic representation. The metering device has a storage container 1 and a discharge device 2 that comprises a conveying device 21 and a drive 24. The storage container 1 has a center axis 12 that extends vertically through the center point of the container plane having the greatest cross-section. The storage container 1 also has an inlet opening 11 at its top, and at its bottom has an outlet opening 13 that has an outlet axis 14. According to the invention, the outlet axis 14 of the outlet opening 13 has a spacing B to the vertical center axis 12.

Located beneath the outlet opening 13 of the storage container 1 is the discharge device 2, namely such that the outlet opening 13 is located above the loading point 22 of the conveying device 21, so that discharge of the material to be conveyed from the storage container 1 into the conveying device 21 is ensured. The conveying device 21 is made constant with regard to its length C and is defined by the distance from the loading point 22 to the delivery point 23. Consequently, a discharge length $x1=C+B$ for the metering device results from the distance from the delivery point 23 to the vertical center axis 12 of the storage container 1.

Figure 5A:
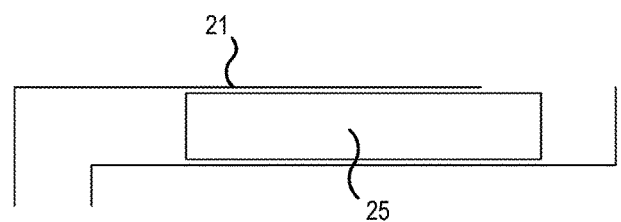
FIGS. 5A and 5B depict a screw conveyor having a single metering screw or a double metering screw.
Figure 5B:
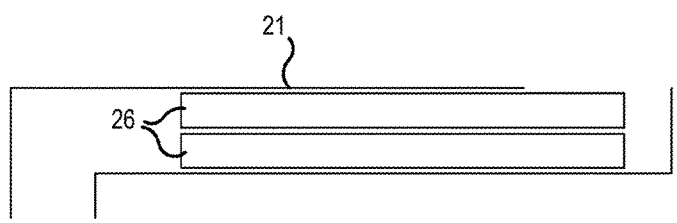

In the present case, the drive 24 of the conveying device 21 is arranged in extension of the conveying direction or in extension of a possible conveyor chute, screw conveyor, or shaft, and is attached thereto. In this way, the entire discharge device 2 can be suspended from the storage container 1. As shown in FIGS. 5A and 5B, if the conveying device 21 is a screw conveyor, the screw conveyor can include a single metering screw 25 or a double metering screw 26. According to the invention, the discharge device 2 is arranged such that it can rotate about the outlet axis 14 of the outlet opening 13 of the storage container 1. This can be accomplished through removable pipe clamps or flanges, for example. The altered position that the storage container 1 and the discharge device 2 can assume due to their ability to rotate is made clear by the dashed representation of the metering device in FIG. 1. In the position shown in dashed lines, the discharge length of the metering device is reduced to $x2=C-B$ with components remaining the same. This discharge length is achieved by the means that the storage container 1 together with the discharge device 2, in other words the metering device as a whole, is rotated by 180° about the center axis 12, and the discharge device 2 is then rotated back again by 180° about the outlet axis 14. The position of the inlet opening 11 of the storage container 1 is independent of this.

Figure 2:
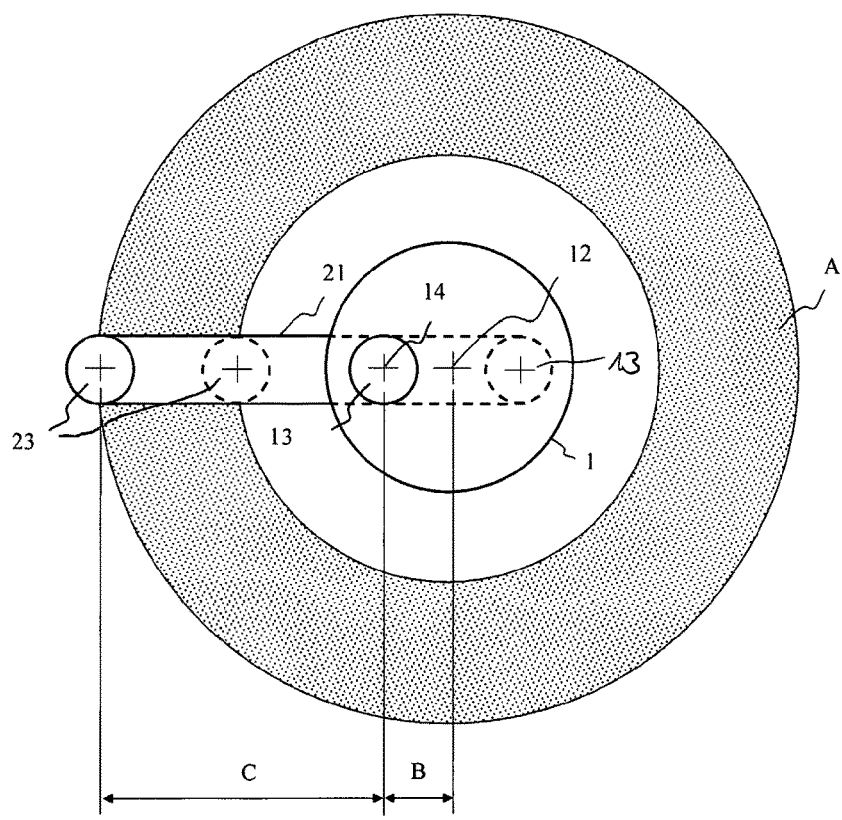
FIG. 2 is a schematic top view of the metering device from FIG. 1.

FIG. 2 shows a top view of the schematically represented metering device from FIG. 1. It is clear from this that not only can the discharge length x1, x2 of the metering device be changed, but any position of the delivery point 23 on the annular area A that is depicted with patterning can also be reached through rotation of the individual components. The wide scope for variations and the flexibility of the metering device according to the invention are thus made apparent.

Figure 3:
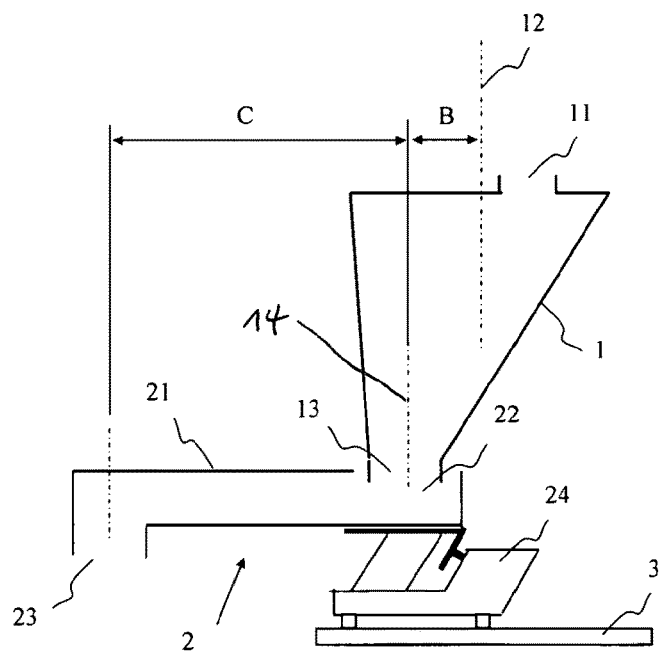
FIG. 3 is a side view of a second embodiment of the metering device according to the invention with maximum discharge length, likewise in a schematic representation.

FIG. 3 shows an alternative embodiment of a metering device according to the invention. The discharge device 2 is standing beneath the storage container 1, and is additionally fastened to a bracket 3. This results in multiple variants for the design solution of the rotatability of the discharge device 2. Firstly, the discharge device 2 can be rotatably attached to the bracket 3, or the bracket 3 can be arranged to be rotatable with respect to the substrate. This depends on the nature of the substrate or substructure of the metering device in each case. The exemplary embodiment shown involves a metering device with a conveyor chute 21 and a vibratory drive 24 that that sets the conveyor chute into vibration. It is important here that the length of the conveyor chute and also the location of its center of gravity relative to the drive do not change when the discharge length of the metering device is changed, since otherwise retuning of the entire system having a conveyor chute and drive would be necessary. In this arrangement, the discharge length x1 between the center axis 12 and the delivery port 23 is $x1=C+B$.

Figure 4:
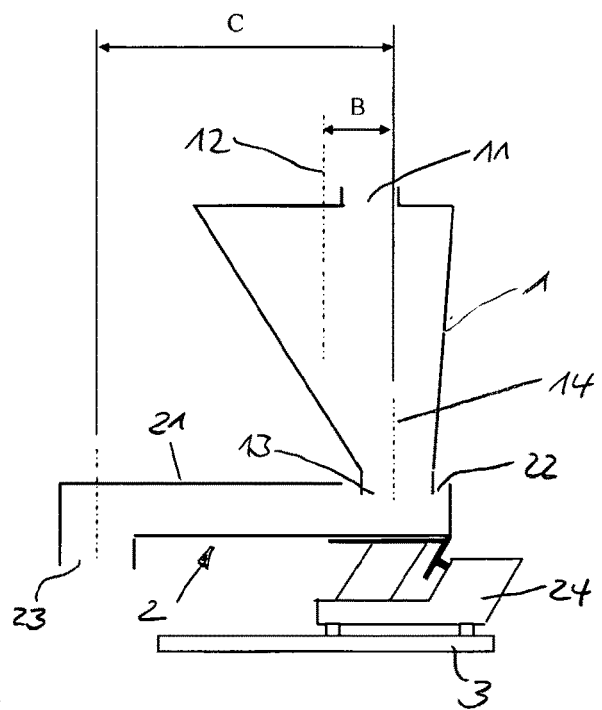
FIG. 4 is a side view of the metering device from FIG. 3 with minimum discharge length.

In FIG. 4, the outlet opening 13 of the storage container 1 is located such that its outlet axis 14, which is arranged eccentrically with respect to the center axis 12, is opposite the conveying direction of the discharge device. In this arrangement, the discharge length x2 between the center axis 12 and the delivery portion 23 becomes x2=C−B.

In FIG. 4, the discharge length x2=C−B is achieved with the same components by the means that the metering device as a whole is first rotated by 180°, and, as in the exemplary embodiment described above, the discharge device 2 is then rotated back again by 180° about the outlet axis 14. The position of the inlet opening 11 of the storage container 1 is independent of this.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A metering device comprising:
   a storage container that has an inlet opening, a vertical center axis, and an outlet opening;
   a discharge device that comprises a conveying device that has a loading point and a delivery point, which are arranged at a distance C from one another; and
   a drive for the conveying device,
   wherein the outlet opening of the storage container corresponds to the loading point of the conveying device,
   wherein the outlet opening has an outlet axis that is arranged at a distance B from the center axis of the storage container, such that the outlet axis is offset from the center axis,
   wherein the discharge device is rotatable about the outlet axis of the outlet opening of the storage container, and
   wherein the storage container is rotatable about the center axis.

2. The metering device according to claim 1, wherein the delivery point of the conveying device is variably arranged in an annular plane A that is substantially perpendicular to the center axis of the storage container.

3. The metering device according to claim 2, wherein the annular plane A has an area $A=\pi*((C+B)^2-(C-B)^2)$.

4. The metering device according to claim 1, wherein the metering device has a discharge length x that corresponds to a distance from the delivery point of the conveying device to the center axis of the storage container, and that is variably adjustable between a maximum value x1=C+B and a minimum value x2=C−B.

5. The metering device according to claim 1, wherein the conveying device of the discharge device is a screw conveyor.

6. The metering device according to claim 5, wherein the screw conveyor is a single metering screw or double metering screw.

7. The metering device according to claim 1, wherein the drive of the discharge device is a vibratory drive that sets the conveying device into vibration.

8. The metering device according to claim 7, wherein the conveyor chute has a same mass and location of center of gravity relative to the vibratory drive with variable discharge length x of the metering device, the discharge length x of the metering device corresponding to a distance from the delivery point of the conveying device to the center axis of the storage container.

9. The metering device according to claim 7, wherein the vibratory drive of the discharge device is provided as a magnetic, pneumatic, eccentric, or unbalanced drive.

10. The metering device according to claim 1, wherein the discharge device is arranged such that it is suspended from the storage container.

11. The metering device according to claim 1, wherein the discharge device is arranged to stand beneath the storage container.

12. The metering device according to claim 1, wherein the discharge device is attached to a bracket.

13. The metering device according to claim 12, wherein the bracket has an area that essentially corresponds to a vertical projection of an area of the storage container.

14. The metering device according to claim 12, wherein the discharge device is disposed beneath the storage container and the bracket is disposed beneath the discharge device, and wherein the discharge device is rotatably attached to the bracket.

* * * * *